United States Patent [19]

Maeda et al.

[11] Patent Number: 5,278,817
[45] Date of Patent: Jan. 11, 1994

[54] OPTICAL PICK-UP FOR USE WITH AN OPTO-MAGNETIC SIGNAL

[75] Inventors: Hideo Maeda, Tokyo; Shigeru Ohuchida, Zama; Junichi Kitabayashi, Kawasaki, all of Japan

[73] Assignee: Ricoh Company, Ltd., Tokyo, Japan

[21] Appl. No.: 833,012

[22] Filed: Feb. 10, 1992

Related U.S. Application Data

[62] Division of Ser. No. 294,466, Jan. 6, 1989, Pat. No. 5,115,423.

[30] Foreign Application Priority Data

| Jan. 7, 1988 | [JP] | Japan | 63-1518 |
| Jan. 13, 1988 | [JP] | Japan | 63-5575 |
| Jan. 29, 1988 | [JP] | Japan | 63-19146 |
| Mar. 23, 1988 | [JP] | Japan | 63-37847 |

[51] Int. Cl.⁵ .............................. G11B 7/00
[52] U.S. Cl. .................. 369/112; 369/44.14; 369/109
[58] Field of Search ........... 369/44.11, 44.14, 44.12, 369/112, 109, 111, 44.37, 44.38, 103; 359/15, 569, 558

[56] References Cited

U.S. PATENT DOCUMENTS

| 3,698,795 | 10/1972 | Flint | 350/162 R |
| 4,475,792 | 10/1984 | Ohnishi et al. | 369/112 |
| 4,729,640 | 3/1988 | Sakata | 359/569 |
| 4,768,183 | 8/1988 | Sica, Jr. | 350/162.17 |
| 4,807,212 | 2/1989 | Kaneda et al. | 369/44.14 |
| 4,817,072 | 3/1989 | Toide et al. | 369/44 |
| 4,832,464 | 5/1989 | Kato et al. | 369/103 |
| 4,894,815 | 1/1990 | Yamanaka | 369/112 |
| 4,918,679 | 4/1990 | Opheij et al. | 369/44 |
| 4,935,911 | 6/1990 | Ohuchida et al. | 369/44.12 |
| 4,945,529 | 7/1990 | Ono et al. | 369/109 |
| 5,013,141 | 5/1991 | Sakata | 359/569 |
| 5,051,974 | 9/1991 | Taniguchi et al. | 369/44.12 |

FOREIGN PATENT DOCUMENTS 63-28124 11/1988 Japan .
63-281125 11/1988 Japan .

*Primary Examiner*—Andrew L. Sniezek
*Assistant Examiner*—Thang V. Tran
*Attorney, Agent, or Firm*—Cooper & Dunham

[57] ABSTRACT

An optomagnetic information recording and reproducing apparatus includes an optomagnetic optical pick-up for recording or reproducing information on or from an optomagnetic information recording disc. An optomagnetic optical pick-up includes a first diffraction grating for receiving light reflected from the disc and separating the light into a first transmitting light which transmits through the first diffraction grating beam and a first diffracted light beam which is diffracted by the first diffraction grating. A second diffraction grating is disposed to receive the first transmitging and diffracted light beams and discharges a second transmitting light beam and a second diffracted light beam. A tracking error detector is provided to receive the second transmitting light beam and a focusing error detector is disposed to receive the second diffracted light beam. An optomagnetic signal is obtained as a difference between outputs from the tracking and focusing error detectors.

18 Claims, 15 Drawing Sheets

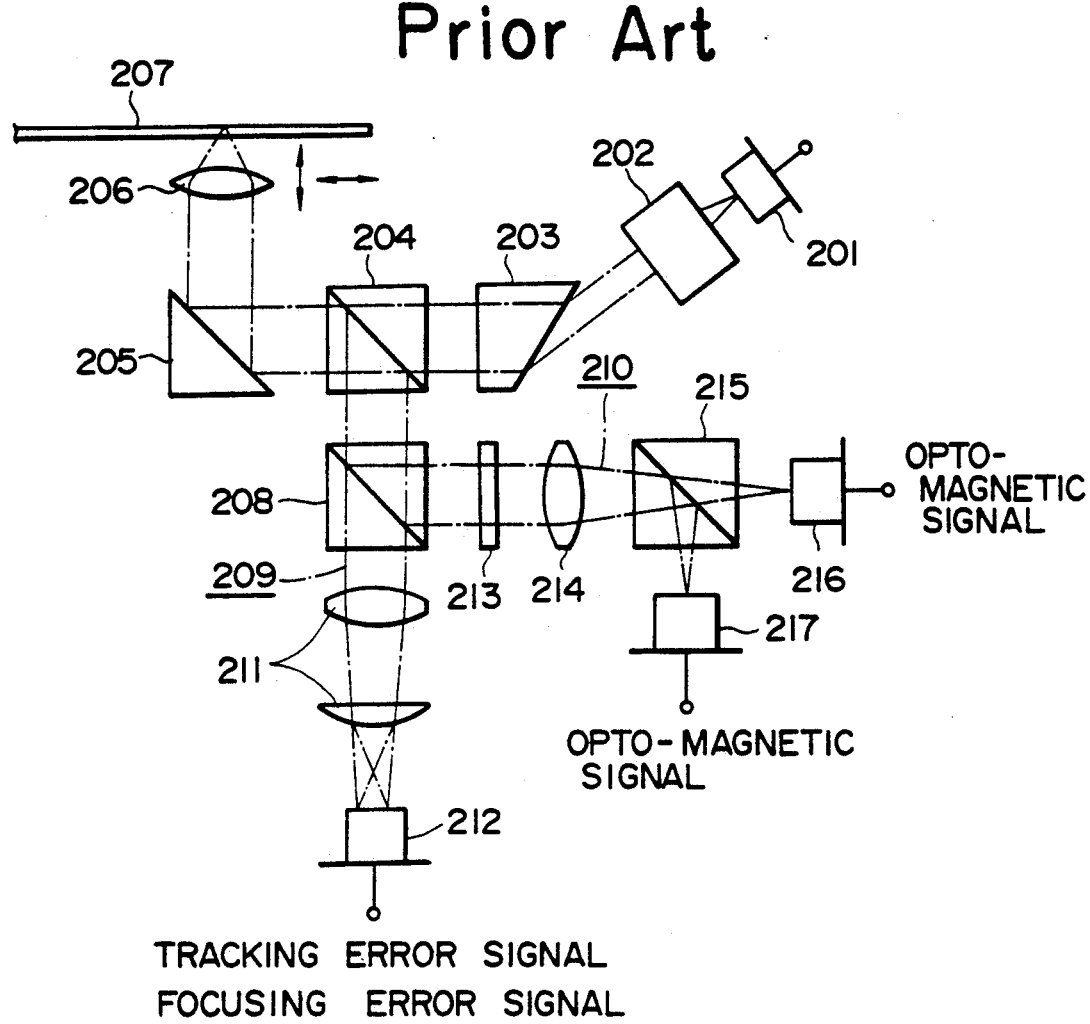
Fig. 24
Prior Art
TRACKING ERROR SIGNAL
FOCUSING ERROR SIGNAL
Fig. 25
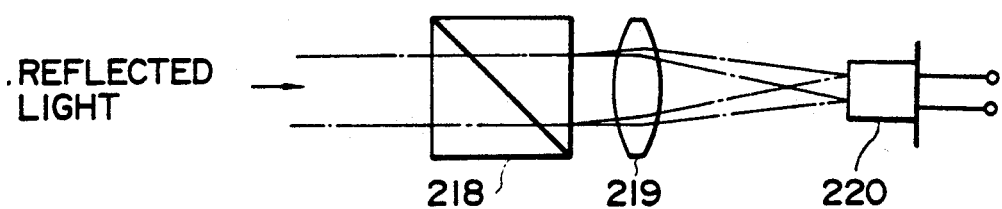

OPTICAL PICK-UP FOR USE WITH AN OPTO-MAGNETIC SIGNAL

This is a division of application Ser. No. 07/294,466 filed Jan. 6, 1989, now U.S. Pat. No. 5,115,423.

BACKGROUND OF THE INVENTION

1. Field of the Invention

This invention generally relates to an optical information recording and reproducing apparatus, and, in particular, to an optomagnetic (or magnetooptic) information recording and reproducing apparatus for optically recording or reproducing information on or from an optomagnetic recording medium, such as an optomagnetic disc, by utilizing the direction of polarization.

2. Description of the Prior Art

FIG. 9 illustrates a typical prior art optical pick-up capable for use in recording, reproducing or erasing information on or from an optomagnetic disc (not shown). The optical pick-up includes an objective lens 1 located facing an optomagnetic disc, an illumination optical system 2, a servo optical system 3 and an optomagnetic detection optical system 4, which are all mounted on a substrate 5. In the illumination optical system 2, laser light emitted from a semiconductor laser 6 is collimated by a coupling lens 7 and the thus collimated light is passed through beams-shaping splitters 8 and 9 to thereby define a light beam circular in shape. Then, this light beam is incident upon a polarization beam splitter 10 which serves to separate the incident light beam from a reflected light beam and which is provided with a polarizing surface 10a for allowing p waves to be transmitted at 100% and reflecting s waves at ⅔, so that only the s wave components are reflected by the polarizing surface 10a and the reflected light beam then passes through the objective lens 1 to be directed toward an optomagnetic disc (not shown).

When the light is reflected by the optomagnetic disc, it is rotated either in the positive or negative direction over a predetermined angle of polarization depending on the recording condition on the optomagnetic disc. Thus, the reflected light beam includes p waves and is directed toward beam splitters 10 and 11. Thus, the s waves reflected by the polarizing beam splitter 11 for separating a servo detecting system and an optomagnetic detection optical system travel through a detection lens 12 of the servo detection system 3 and a knife edge prism 13 and are received by a tracking light detector 14 and a focusing light detector 15. A tracking detection is carried out by a so-called push-pull method. The s waves transmitting through the polarization beam splitters 10 and 11 and the p waves produced by reflection have their planes of polarization rotated over 45° when passing through a half wavelength plate 16 located next to the polarization beam splitter 11 in the optomagnetic detection optical system 4. Furthermore, p and s wave components are separated by a Wollaston prism 17 and then an image is formed on a light detector 19 by a detection lens 18 to thereby detect the direction of polarization, whereby the presence of absence of a recorded signal is detected.

However, in such a prior art structure, since tracking signal detection, focusing signal detection and optomagnetic signal detection are carried out by respective, separate optical systems, there must be provided a great number of optical components. In this case, there must be provided the half wavelength plate 16 and the Wollaston prism 17 as optical components for detecting the direction of polarization of reflected light in the optomagnetic detection optical system 4, and, thus, the optical system is rather complicated in structure. In particular, positioning must be carried out for the polarizing beam splitter 10, half wavelength plate 16 and Wollaston prism 17 individually. As a result, the number of steps in assembly increases and the stability tends to be impaired. Moreover, since there must be provided such a great number of optical components, the entire apparatus is rather heavy in weight and the access speed is rather slow.

In order to provide a high-speed access time in an optomagnetic disc apparatus, it is imperative to make an optical pick-up compact in size and light in weight. In this respect, there has previously been proposed an optical pick-up utilizing a high density diffraction grating as shown in FIG. 10, which was the subject of a Japanese Patent Application which has been assigned to the assignees of this application and thus hereby incorporated by reference. In the structure of FIG. 10, similarly with the case of FIG. 9, laser light emitted from a semiconductor laser 21 travels through a coupling lens 22, beam shaping splitters 23 and 24, a polarizing surface 25a of a polarization beam splitter 25 and an objective lens 26 and is focused onto an optomagnetic disc (not shown). The light reflected from the optomagnetic disc again travels through the objective lens 26 and the polarizing beam splitter 25 and then is separated from the incoming light beam to be directed toward a lens 27. Thereafter, the light enters a high density diffraction grating 28 which is inclined at a predetermined angle, where the incoming light is separated into transmitting light 29 of 0th order light and diffracted light 30 of 1st order light. The transmitting light 29 is received by a 4-division light-receiving device 31 for use in detecting a focusing signal; on the other hand, the diffracted light 30 is received by a 2-division light-receiving device 32 for use in detecting a tracking signal.

The high density diffraction grating 28 typically has such a polarization dependency characteristic as shown in FIG. 11. Thus, detection of an optomagnetic signal recorded on an optomagnetic disc is carried out as a difference between the outputs from the light-receiving devices 31 and 34. That is, with an angle of polarization denoted by alpha, the use rate of the 1st order light is approximately equal to $\sin^2$ alpha and the use rate of the 0th order light is approximately equal to $\cos^2$ alpha, so that a difference between the two is $\sin^2$ alpha $-\cos^2$ alpha. Detection of a focusing signal is carried out by an output from the 4-division light-receiving device 31 utilizing astigmatism which is produced by the lens 27 and the high density diffraction grating 28. Detection of a tracking signal is carried out by the 2-division light-receiving device 32 according to a push-pull method utilizing the 1st order light (diffracted light 30).

With this optical pick-up structure, the number of required components may be reduced and the overall structure may be made compact in size and light in weight as compared with the optical pick-up structure shown in FIG. 9. However, since use is made of the high density diffraction grating 28, the diffraction angle of the 1st order light would deviate significantly due to fluctuations in the wavelength of laser light from the semiconductor laser 21. For example, if a constant n of the high density diffraction grating 28 is equal to 1.5, when the wavelength abruptly changes by 2 nm, a light spot will be shifted over 0.15 mm at a point 30 mm away from the grating. Besides, since the two light-receiving devices 31 and 34 are spaced apart from each other over a relatively long distance, there is a difficulty in assembly and also in adjustments. In particular, there is a possibility that the tracking signal detecting light-receiving device 32 is located in a direction vertical to the plane of the drawing, in which case difficulty is increased even more.

SUMMARY OF THE INVENTION

In accordance with the present invention, there is provided an improved optomagnetic information recording and reproducing apparatus in which light from a light source is irradiated onto an optomagnetic recording medium to thereby carry out recording or reproducing of information. The apparatus includes a light separating means having a first diffraction grating, into which reflected light from the optomagnetic recording medium is incident, and a second diffraction grating. The 0th and 1st order light emitted as separated from the first diffraction grating are both incident upon the second diffraction grating from which the 0th and 1st order light are again emitted as 0th and 1st order light as separated. The apparatus also includes a tracking signal detecting light detector which receives either one of the 0th and 1st order light emitted from the second diffraction grating and a focusing signal detecting light detector which receives the other of the 0th and 1st order light emitted from the second diffraction grating. Then, an optomagnetic signal is obtained as a difference between the outputs from these light detectors.

It is therefore a primary object of the present invention to obviate the disadvantages of the prior art as described above and to provide an improved optomagnetic information recording and reproducing apparatus.

Another object of the present invention is to provide an improved optomanetic information recording and reproducing apparatus compact in size and light in weight.

A further object of the present invention is to provide an improved optomagnetic information recording and reproducing apparatus fast and reliable in operation.

A still further object of the present invention is to provide an improved optomagnetic information recording and reproducing apparatus which is least affected by fluctuations in the wavelength of light emitted from a light source for use in recording or reproducing information.

A still further object of the present invention is to provide an improved optomagnetic information recording and reproducing apparatus which requires a minimum number of components and thus which is easy to manufacture and carry out adjustments.

A still further object of the present invention is to provide an improved optical information recording and reproducing apparatus utilzing the direction of polarization in recording and reproducing information to and from an optical disc.

Other objects, advantages and novel features of the present invention will become apparent from the following detailed description of the invention when considered in conjunction with the accompanying drawings.

BRIEF DESCRIPTION OF THE DRAWINGS

FIG. 24 is a schematic illustration showing the overall structure of a typical prior art optomagnetic information recording an reproducing apparatus;

FIGS. 25 through 27 are schematic illustrations showing modifications of the optomagnetic optical pick-up;

DESCRIPTION OF THE PREFERRED EMBODIMENTS

Figure 1:
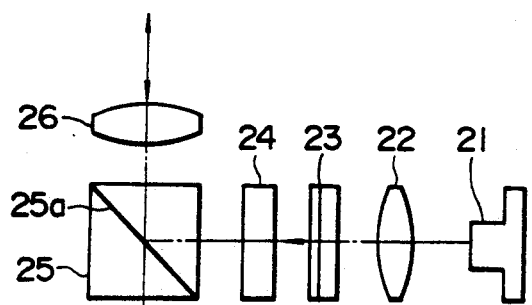
FIG. 1 is a schematic illustration showing an optomagnetic information recording and reproducing apparatus constructed in accordance with one embodiment of the present invention.
Figure 2:
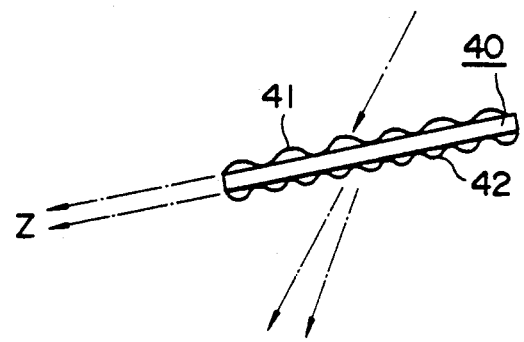
FIG. 2 is a schematic illustration showing a double diffraction grating provided in the structure shown in FIG. 1.

Referring now to FIGS. 1 through 4, an optomagnetic information recording and reproducing apparatus constructed in accordance with one embodiment of the present invention will be described. The present apparatus has a basic structure which is similar in many respects to that of an optical pick-up shown in FIG. 10 so that like elements are indicated by like numerals. In the first place, in place of the high density diffraction grating 28 of FIG. 10, provision is made of a double diffraction grating 40 as a light separating means. This double diffraction grating 40 is integrated in structure and of the light transmitting type, and it includes a substrate, a first diffraction grating 41 provided on one surface of the substrate (light incident side facing a lens 27) and a second diffraction grating 42 provided on the opposite surface of the substrate (light emitting side). The double diffraction grating 40 is disposed as inclined at a predetermined angle in the optical path (optical axis of the objective lens 26) for the reflected light 39 from an optomagnetic disc as an optomagnetic information recording medium.

At the light-emitting side of the double diffraction grating 40 are disposed a 2-division light-receiving device 44 as a tracking signal detecting light detector for receiving, for example, the diffracted light 43 of 1st order light and a 4-division light-receiving device 46 as a focusing signal detecting light detector for receiving the transmitted light 45 of 0th order light. With this structure, a focusing (error) signal is detected by an astigmatic method using the 4-division light-receiving device 46 for receiving the transmitted light 45 from the double diffraction grating 40, and a tracking (error) signal is detected by a push-pull method using the 2-division light-receiving device 44 which receives the diffracted light 43. And, an optomagnetic signal from an optomagnetic disc is obtained by taking a difference between the outputs from the light-receiving devices 44 and 46.

Figure 3:
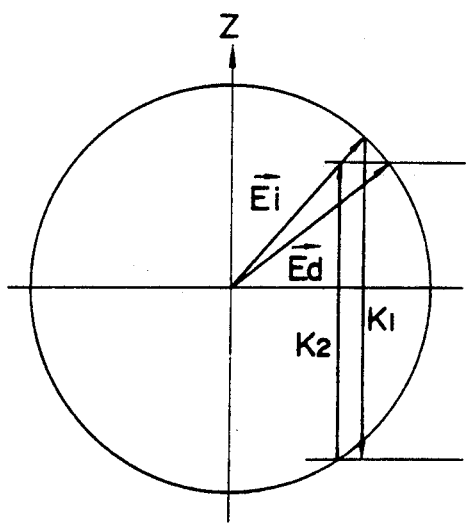
FIG. 3 is an illustration which is useful for explaining the function of the double diffraction grating shown in FIG. 2.

The provision of the double diffraction grating 40 is important in the present embodiment, and the direction of diffraction in the double diffraction grating 40 will be explained with reference to FIG. 3. Incident light $\vec{E}i$ of the reflected light 39 incident upon the double diffraction grating 40 through the lens 27 is diffracted by the first diffraction grating 41 having a grating constant $K_1$ under a phase matching condition in the Z direction, so that it is separated into the transmitting 0th order light and the diffracted 1st order light. The 1st order light diffracted by the first diffraction grating 41 is again diffracted by the second diffraction grating 42 having a grating constant $K_2$, and there is emitted diffracted light $\vec{E}d$ having a direction in vector representation in FIG. 3. Since the diffracted light $\vec{E}d$ has been diffracted twice, i.e., once by the diffraction grating 41 and for the second time by the diffraction grating 42, it may be referred to as $1st^2$ order light (=diffracted light 43) as compared with simple 1st order light. Similarly, since the incident light $\vec{E}i$=transmitted light 45 passes through both of the diffraction gratings 41 and 42, it may be referred to as $0th^2$ order light.

Figure 11:
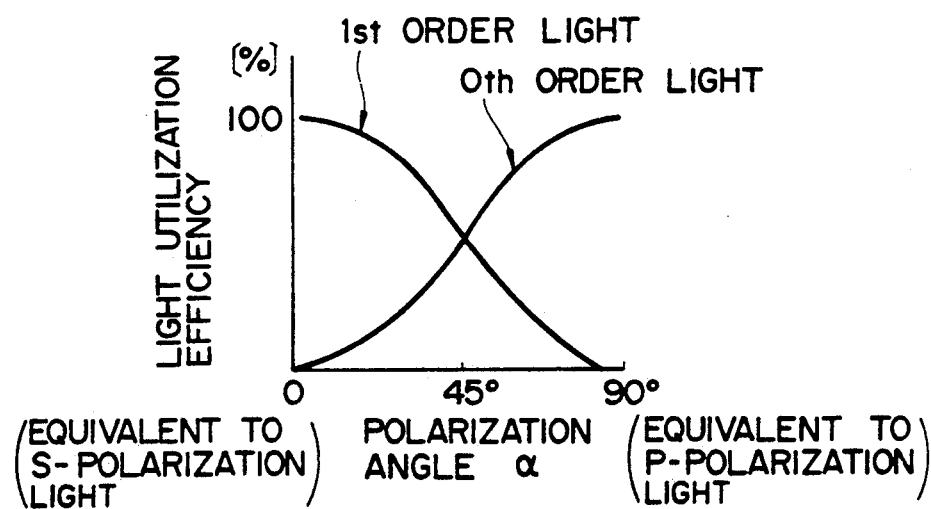
FIG. 11 is a graph showing a relationship between the polarization angle of a diffraction grating and the light utilization efficiency.

Such $0th^2$ and $1st^2$ order light may be separated when emitted at a predetermined separation angle $\theta$ by appropriately setting the grating constants $K_1$ and $K_2$ of the diffraction gratings 41 and 42. In this case, constants $K_1$ and $K_2$ of the diffraction gratings 41 and 42 of the double diffraction grating 40 may be so set to have a characteristic similar to the light utilization efficiency shown in FIG. 11. Thus, the light utilization efficiencies of the $1st^2$ and $0th^2$ order light become approximately equal to $\sin^4$ alpha and $\cos^4$ alpha, respectively. A difference between the two may thus be expressed in the following manner.

$$\sin^4 \text{alpha} - \cos^4 \text{alpha} = (\sin^2 \text{alpha} + \cos^2 \text{alpha}) \cdot (\sin^2 \text{alpha} - \cos^2 \text{alpha}) = \sin^2 \text{alpha} - \cos^2 \text{alpha}$$

Figure 4:
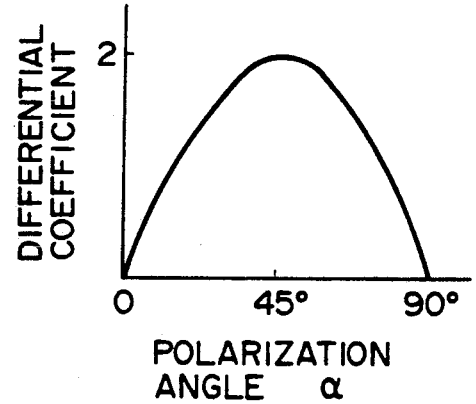
FIG. 4 is a graph showing a relationship between the polarization angle and the differential coefficient of the light use rate of a difference between $0^2$ and $1^2$ order light for inputting polarization angle.
Figure 10:
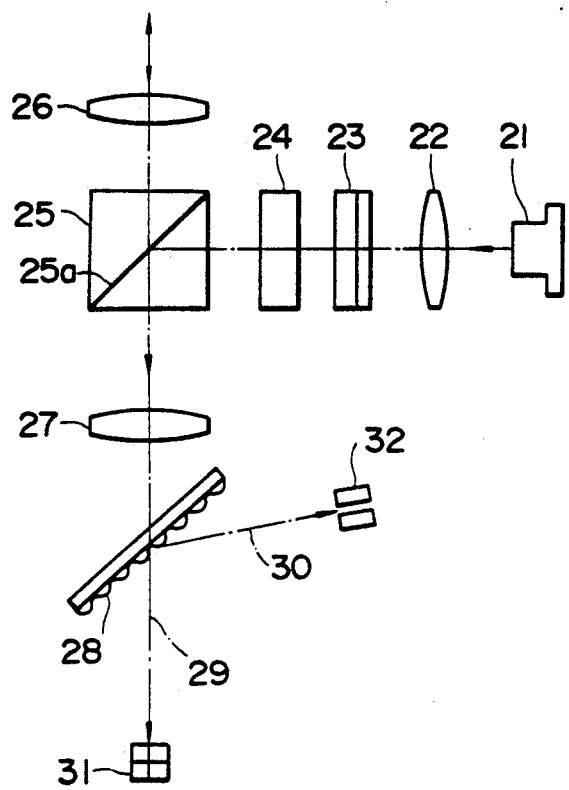
FIG. 10 is a schematic illustration showing another prior art optical pick-up for use in an optomagnetic information recording and reproducing apparatus.

This indicates the fact that, even in the present embodiment using the double diffraction grating 40, there is obtained a result similar to the difference in light utilization efficiency between the 0th and 1st order light in the case of using the high density diffraction grating 28 having a single diffraction grating structure shown in FIG. 10. As shown in FIG. 4, a differential coefficient of light utilization efficiency of a difference between the $0th^2$ and $1st^2$ order light for an input polarization plane by the double diffraction grating 40 may be expressed in the following manner.

$$\frac{d}{d \text{ alpha}} (\sin^2 \text{alpha} - \cos^2 \text{alpha}) = 2 \sin \text{alpha} \cos \text{alpha} + 2 \sin \text{alpha} \cos \text{alpha} = 2 \sin 2\text{alpha}$$

Figure 9:
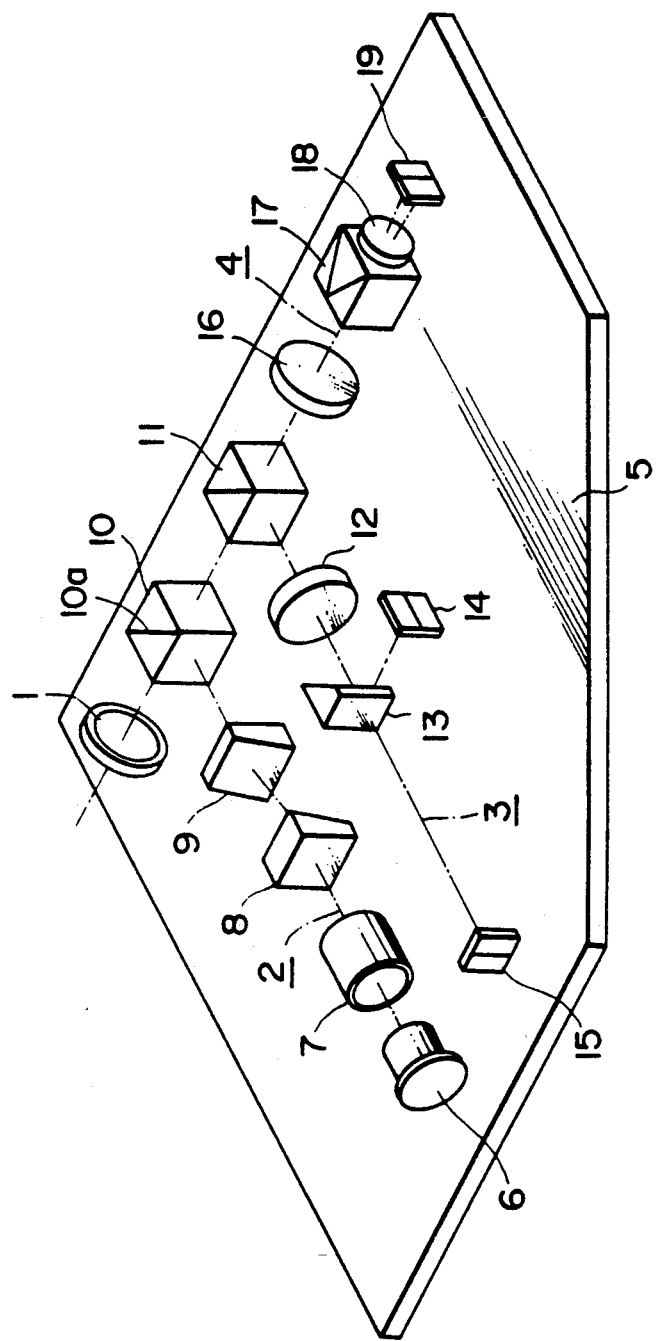
FIG. 9 is a schematic illustration showing in perspective view a typical prior art optical pick-up for use in an optomagnetic information recording and reproducing apparatus.

In this manner, in accordance with the present embodiment, there is simply provided the double diffraction grating 40 in place of the high density diffraction grating 28 of FIG. 10; however, there are following advantages as compared with the structure shown in FIG. 10. In the first place, even if fluctuations occur in the laser light emitted from the semiconductor laser 21, there is produced almost no shift in the $1st^2$ order light (diffracted light 43) coming out of the double diffraction grating 40. For example, if the grating constant n=1.5, the amount of a shift of a light spot at a position 30 mm away from the double diffraction grating 40 for 2 nm of fluctuation in wavelength is very small and in the order of 2 micron meters. Thus, it may be understood that the present optical pick-up is least affected by fluctuations in wavelength. Second, in the present embodiment, the light-receiving device 44 for detecting a tracking signal and the light-receiving device 46 for detecting a focusing signal may be arranged extremely closely to each other. In addition, the distance between these light-receiving devices 44 and 46 may be set variably appropriately by appropriately setting and adjusting the respective grating constants $K_1$ and $K_2$. Thus, in assembly, it is required to adjust only once for one of the detectors (light-receiving devices 44 and 46) to the other. Moreover, there is no possibility that the light-receiving device 44 is located in the vertical direction with respect to the plane of the drawing and it may be arranged on the plane of the drawing together with the light-receiving device 46, so that its assembly is extremely simple. Furthermore, similarly with the structure shown in FIG. 9, there may be provided an optical pick-up fewer in the number of parts, light in weight, compact in size and fast in access operation.

In the above-described embodiment, it is so structured that detection of a focusing signal is carried out using the transmitted light 45 ($=0th^2$ order light) coming out of the double diffraction grating 40 and detection of a tracking signal is carried out using the diffracted light 43 ($=1st^2$ order light). However, it may also be so structured to detect a focusing signal using the diffracted light 43 and a tracking signal using the diffracted light 45. In this case, the diffracted light 43 from the double diffraction grating 40 is detected by the 4-division light-receiving device 46 for detecting a focusing signal and the transmitted light 45 is received by the 2-division light-receiving device 44 for detecting a tracking signal.

Figure 5:
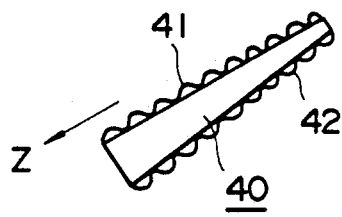
FIG. 5 is an illustration showing a modified example of the double diffraction grating.
Figure 6:
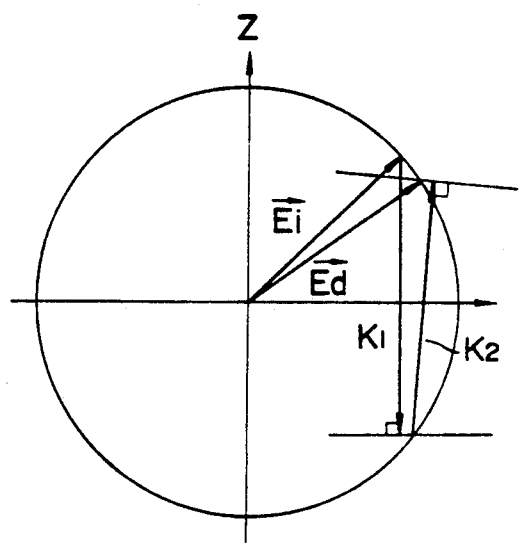
FIG. 6 is an illustration which is useful for explaining the function of the double diffraction grating shown in FIG. 5.

As shown in FIG. 5, the double diffraction grating 40 may be so structured that it includes a substrate which is generally wedge-shaped and the diffraction gratings 41 and 42 provided on the opposite surfaces of the substrate have the same grating constants $K_1$ and $K_2$. FIG. 6 illustrates a vector representation indicating the direction of diffraction in the case of the double diffraction grating 40 shown in FIG. 5. In this double diffraction grating 40, since the diffraction gratings 41 and 42 have the same grating constants, it can be manufactured with ease.

Figure 7:
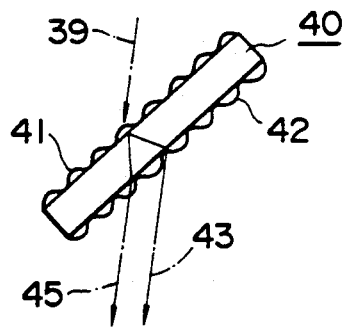
FIG. 7 is a schematic illustration showing another modified example of the double diffraction grating.

In the above-described embodiment, the grating vectors of the respective diffraction gratings 41 and 42 are made different relative to each other. In an alternative structure, the grating constants of the respective diffraction gratings 41 and 42 may be made equal while maintaining the substrate as a parallel plate. FIG. 7 illustrates such a modified embodiment, in which separation between the $0th^2$ and $1st^2$ order light is attained by the thickness of the substrate of the double diffraction grating 40. With this structure, there will be no fluctuations in the output angle of the $1st^2$ order light due to fluctuations in the wavelength of the laser light. Furthermore, the double diffraction grating 40 may be of the reflecting type instead of the transmitting type as in the present embodiment. And, as an optical system as a whole, the light source side and the detecting system side may be replaced with the polarization beam splitter 25 as a boundary in FIG. 1.

Figure 8:
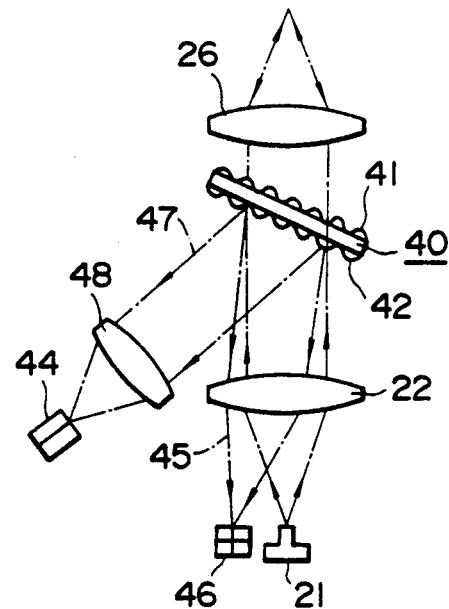
FIG. 8 is an optomagnetic information recording and reproducing apparatus constructed in accordance with another embodiment of the present invention.

FIG. 8 schematically illustrates an optical pick-up for use in an optomagnetic information recording and reproducing apparatus constructed in accordance with another embodiment of the present invention. As shown, this embodiment is constructed by omitting the polarization beam splitter 25. The laser light emitted from the semiconductor laser 21 disposed in the vicinity of the 4-division light-receiving device 46 passes through the coupling lens 22 and travels through the diffraction gratings 42 and 41 of the double diffraction grating 40 before it reaches an optomagnetic disc (not shown). That is, the $0th^2$ order light passing through the double diffraction grating 40 is irradiated to the optomagnentic disc. And, the light reflected from the optomagnetic disc is again incident upon the double diffraction grating 40 and the $1st^2$ order light coming out of the double diffraction grating 40 again passes through the coupling lens 22 to be focused onto the 4-division light-receiving device 46 with astigmatism so that a focusing signal is detected. The astigmatism may be appropriately set in consideration of the grating constants of the diffraction gratings 41 and 42 of the double diffraction grating 40 and the thickness thereof.

On the other hand, the 0th order light - 1st order light or 1st order light - 0th order light 47 obtained by passing the light through the diffraction gratings 41 and 42 of the double diffraction grating 40 in succession is focused onto the 2-division light0-receiving device 44 by a lens 48, whereby a tracking signal is detected by the push-pull method. In this case, since the 0th order light - 1st order light or the 1st order light - 0th order light 47 is influenced by fluctuations in wavelength, it is preferable to use a 2-division light-receiving device whose division line is parallel to the direction of fluctuation as the 2-division light-receiving device 44. Alternatively, the grating constant may be set to be small such that the separation angle between the $0th^2$ order light and the $1st^2$ order light is small and the collimating and shaping lens 22 may also serve as the lens 48 for detecting a tracking signal. In this case, however, the ability to detect an optomagnetic signal somewhat deteriorates. In the above description, the generation of astigmatism for detecting a focusing signal has been explained to be influenced by the grating constant and the thickness. Alternatively, use may be made of diffraction gratings having modulated grating constants, such as varying grating pitch in a stepwise fashion, as the diffraction gratings 41 and 42.

Figure 16:
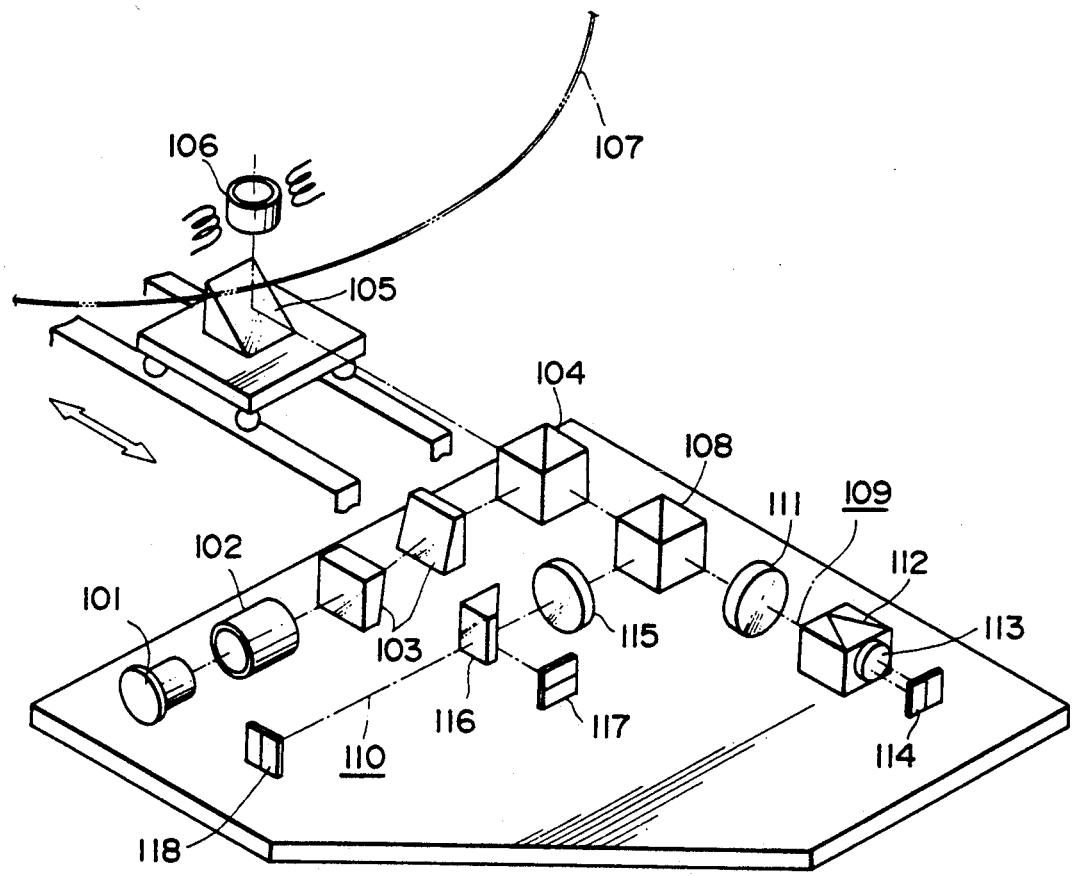
FIG. 16 is a schematic illustration showing a typical prior art optical information recording and reproducing apparatus.
Figure 17:
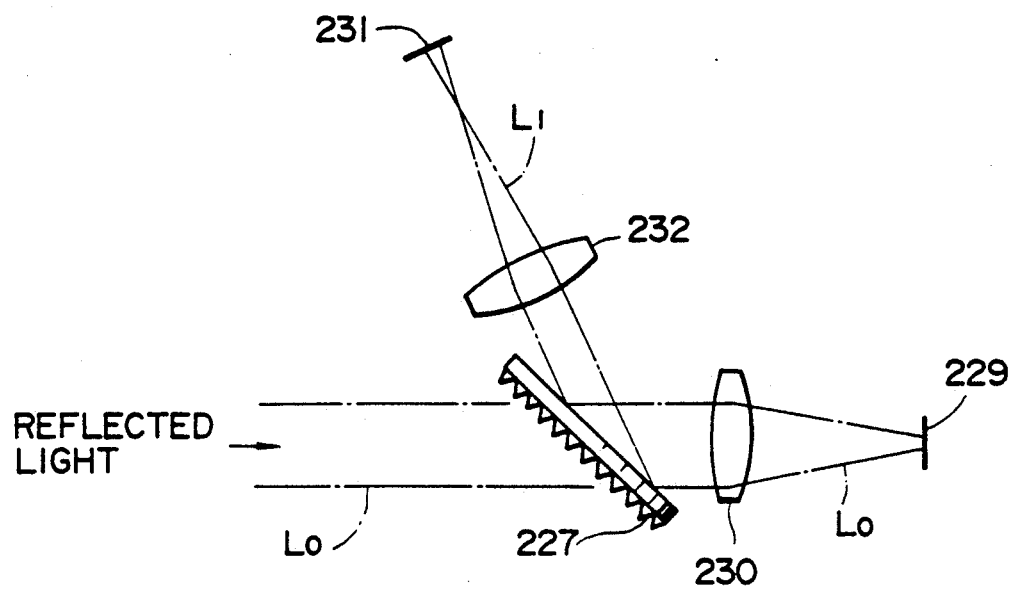
FIG. 17 is a schematic illustration showing an optomagnetic optical pick-up for use in an optomagnetic information recording and reproducing apparatus constructed in accordance with one embodiment of the present invention.
Figure 18:
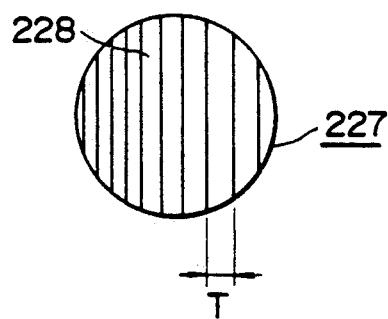
FIG. 18 is a schematic illustration showing the structure of the hologram used in the structure shown in FIG. 17.
Figure 19:
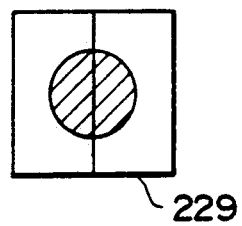
FIG. 19 is a schematic illustration showing the structure of the 2-division light-receiving device used in the structure shown in FIG. 17.
Figure 20:
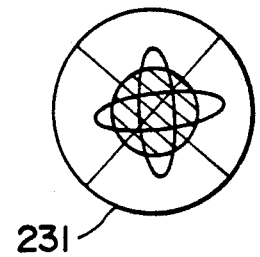
FIG. 20 is a schematic illustration showing the structure of the 4-division light-receiving device used in the structure shown in FIG. 17.

FIG. 16 illustrates another typical prior art optical information recording and reproducing apparatus. The light emitted from a semiconductor laser 101 passes through a coupling lens 102 to be collimated and then passes through a beam shaping splitter 103 whereby the plane of polarization is changed from an ellipse to a circle. The light which has been shaped to be circular then passes through a first polarization beam splitter 104, which allows 100% of the p-polarized light to transmit and causes 66% of the s-polarized light to reflect (this characteristic also holds true for a later-described second polarization beam splitter) so that only the s-polarized light travels through a polarization prism 105 and an objective lens 106 to be focused onto an optical disc 107. Then, the light is reflected in the form of p-polarized waves depending on the direction of magnetization of the optical disc as an optical information recording medium.

The light reflected from the optical disc 107 then passes through the first polarization beam splitter 104 and then it is split into two beams by a second polarization beam splitter 108, one of which passes therethrough to be directed toward an optomagnetic detection optical system 109 and the other of which is deflected to be directed toward a servo detection system 110. In the optomagnetic detection optical system 109, the reflected light containing p-polarized waves transmitting through the first polarization beam splitter 104 is rotated over 45° by a half wavelength plate 111 and then separated between normal light and abnormal light by a Wollaston prism 112, which are then led toward a light-receiving device 114 having a 2-division light-receiving surface through a detection lens 113, so that an optomagnetic signal recorded on the optical disc 107 can be detected. With this, the amount of each of the normal and abnormal light can be determined and it can be detected whether or not the direction of polarization has been changed or not.

In the servo optical system 110, the light of s-polarized waves reflected by the second polarization beam splitter 108 is focused by the focusing lens 115 and then divided into two light beams by a knife edge prism 116. And, the light reflected by the knife edge prism 116 is led to a tracking error detecting light-receiving device 117 whereby a tracking error signal is detected to carry out a tracking servo control operation. On the other hand, the light which has been separated and which has advanced straight is directed toward a focusing error detecting light-receiving device 118, whereby a focusing error signal is detected to carry out a focusing servo control operation.

In the case of the above-described prior art structure, since the number of parts is large, its assembly and adjustment take time and the overall structure tends to be bulky, which tend to push up the cost.

This aspect of the present invention has been particularly directed to solve the problems set forth immediately above and to provide an improved optical information recording and reproducing apparatus fewer in the number of parts, compact in size, light in weight and low at cost. In accordance with this aspect of the present invention, there is provided an improved optical information recording and reproducing apparatus which comprises an optical element which is disposed in an optical path for light reflected by a polarization beam splitter and which is formed with a first linear diffraction grating differing in grating spacing at its light input surface and with a second linear diffraction grating differing in grating spacing in a direction perpendicular to the direction in which the first diffraction grating is formed at its light output surface to which the light passing through the light inlet surface and reflected by a reflecting surface is directed. A 4-division light-receiving device is provided in an optical path for the light output from the light output surface. Thus, the light output from the optical element is directed toward the 4-division light-receiving device to carry out a focusing servo control operation. With this structure, the number of parts required in the servo optical system can be reduced so that there can be provided an apparatus light in weight, compact in size and low at cost.

In addition, a 2-division light-receiving device may be provided in contact with the reflecting surface. In this case, a tracking servo control operation can also be carried out.

Figure 12:
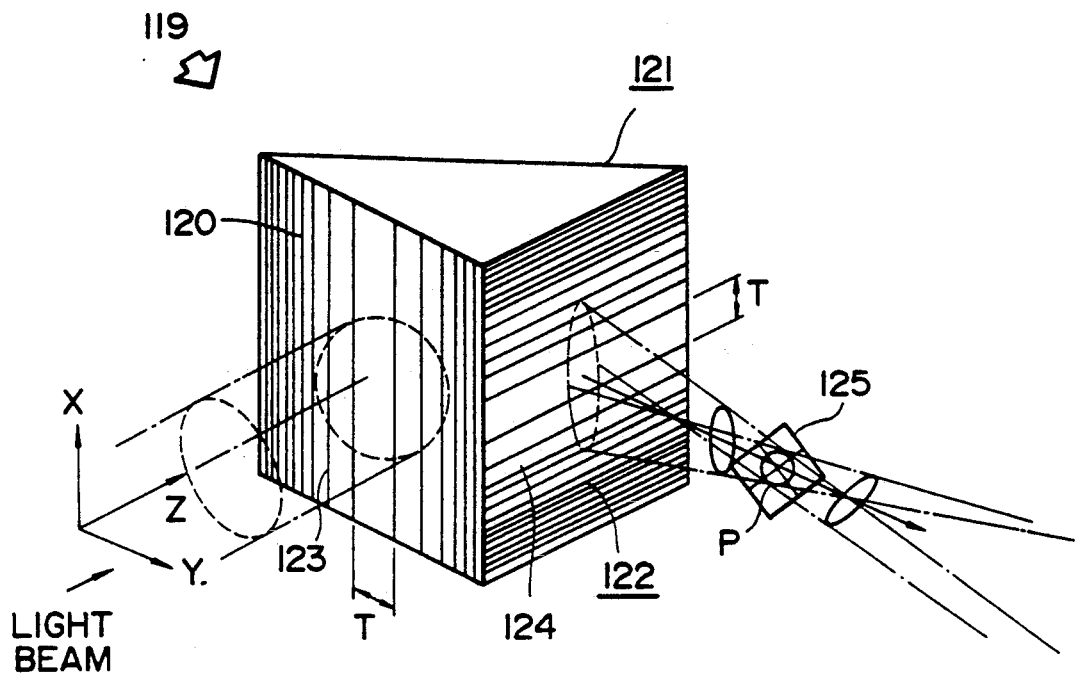
FIG. 12 is a schematic illustration showing in perspective view an optical information reading apparatus constructed in accordance with one embodiment of the present invention.
Figure 13:
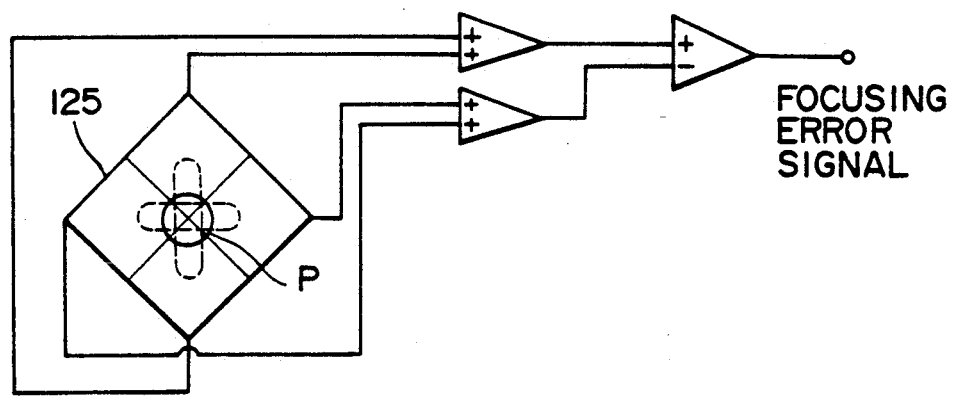
FIG. 13 is an illustration showing a 4-division light-receiving device with an associated circuit structure used in the apparatus of FIG. 12.

Referring now to FIGS. 12 and 13, an optical information recording and reproducing apparatus constructed in accordance with one embodiment of the present invention will be described in detail below. It is to be noted that like numerals used in FIG. 16 will be used for like elements.

An optical element 119 is in the shape of a triangular prism and it is formed with a light input surface 120 into which the light reflected from an optical disc 107 is input, with a reflecting surface 121 for reflecting the light passing through the light input surface 120 and with a light output surface 122 through which the light reflected by the reflecting surface 121 is output. The light input surface 120 is formed with a first linear diffraction grating 123 in parallel with X direction such that the grating spacing T is coarse at the center and becomes gradually dense toward the ends. The light output surface 122 is formed with a second linear diffraction grating 124 extending in Z direction perpendicular to the direction along which the first diffraction grating 123 is formed and similar in structure to the first diffraction grating 123.

The optical element 119 is located in an optical path for the light which is reflected by the second polarization beam splitter 108 (see FIG. 16) for the reflected light from the optical disc 107. In addition, a 4-division light-receiving device 125 for carrying out a focusing servo control operation is provided in an optical path for the light output from the light output surface 122 of the optical element 119.

A method for carrying out a focusing servo control operation using the optical element 119 will be described below. The light which has been reflected by the second polarization beam splitter 108 and which has been input into the light input surface 120 of the optical element 119 is focused in Y direction by the first diffraction grating 123 so that its beam shape is changed from a circular shape into an ellipse elongated in X direction. And, the light thus deformed is reflected by the reflecting surface 121 and then output through the light output surface 122, whereby the light thus modified is focused by the second diffraction grating 124 in X direction so that its beam shape is changed into an elliptical shape elongated in Z direction.

Thus, the light output through the light output surface 122 of the optical element 119 is a light beam having astigmatism. Thus, with the 4-division light-receiving device 125 disposed at a position P in the optical path where a beam shape becomes circular, a focusing servo control operation can be carried out according to a well-known astigmatic method.

Figure 14:
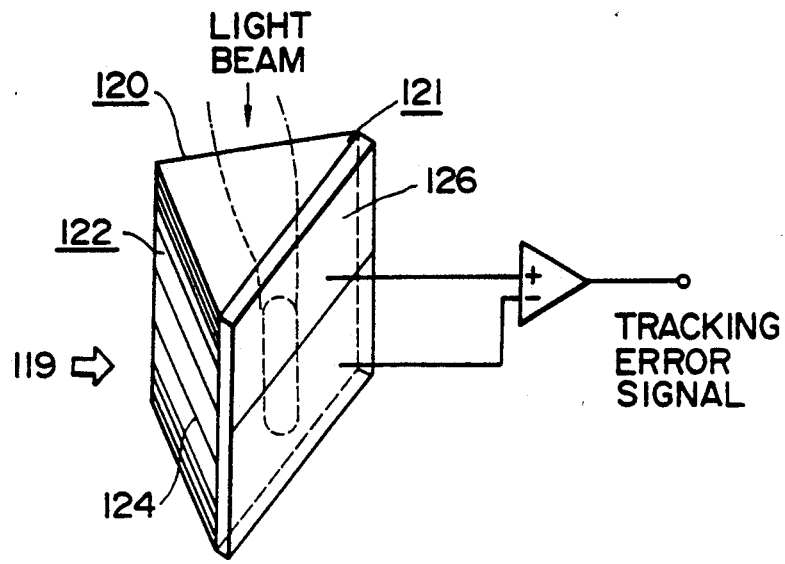
FIG. 14 is a schematic illustration showing an optical information reading apparatus constructed in accordance with another embodiment of the present invention.

Now, FIG. 14 schematically illustrates an optical element 119 constructed in accordance with another embodiment of this aspect of the present invention. The present optical element 119 is so structured to allow to carry out not only a focusing servo control operation, but also a tracking servo control operation. Thus, a description regarding a focusing servo control operation of this optical element 119 will be omitted and only its tracking servo control operation will be described. It is to be noted that like numerals indicate like elements in the previous embodiment.

The present optical element 119 includes a 2-division light-receiving device 126 directly attached to its light reflecting surface 121. The reflecting surface 121 is set at a predetermined angle such that a portion of the light transmitting through the light input surface 120 transmits therethrough to enter the 2-division light-receiving device 126 and the remaining portion of the light transmitting through the light input surface 120 is reflected to be directed toward the light output surface 122. With this structure, a light beam which has entered the light input surface 120 of the optical element 119 and then which has been deformed to become elongated in X direction by the first diffraction grating 123 transmits through the reflecting surface 121 to be led into the 2-division light-receiving device 126 so that a tracking error signal can be detected by the well-known push-pull method to thereby carry out a tracking servo control operation.

Figure 15:
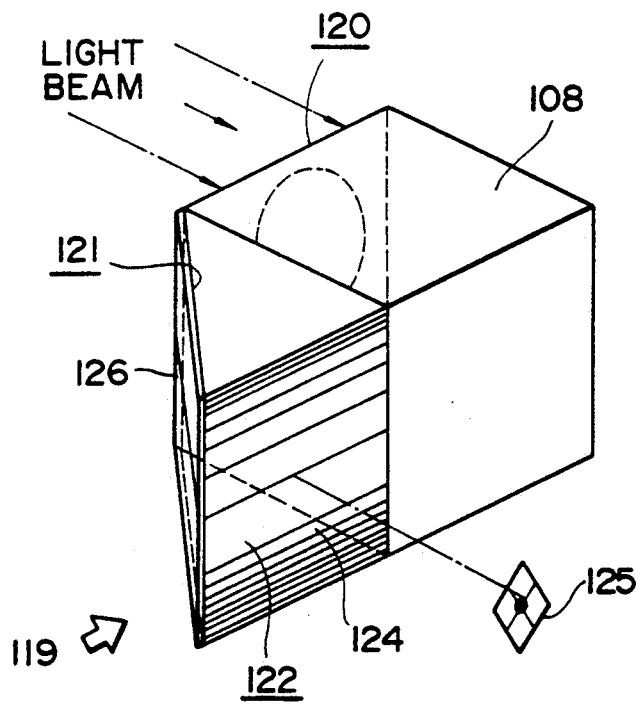
FIG. 15 is a schematic illustration showing a modified structure in which an optical element and a second polarization light beam splitter are combined in one unit.

As described above with reference to the first and second embodiments, in a servo optical system which carries out focusing and tracking servo control operations, the optical element 119 may replace such components as focusing lens 115 and knife edge prism 116. The first and second diffraction gratings 123 and 124 differ in structure in that their directions of gratings are perpendicular to each other, and there are not any other constraints as to the differences between these two gratings. If the diffraction gratings 123 and 124 are set to have the same grating spacing T, they may be formed from one kind of a mold, which contributes to lower the manufacturing cost. As an alternative structure, the second beam splitter 108 may be integrated with the optical element 119 as shown in FIG. 15, in which case, the required installation space may be reduced significantly and the apparatus can be made smaller in size and lighter in weight.

A further aspect of the present invention will now be described below. This aspect of the present invention relates to an optical pick-up for use in an optical information recording and reproducing apparatus utilizing the light emitted from a semiconductor laser. In the first place, FIG. 24 illustrates a typical prior art optomangetic optical pick-up for use in an optomagnetic information recording and reproducing apparatus. The light emitted from a semiconductor laser 201 is collimated by a collimator lens 202 and the thus collimated light is changed from an elliptical cross section to a circular cross section by a beam shaping prism 203. The light whose cross section has been changed to a circular cross section passes through a first beam splitter 204, is reflected by a total reflection mirror 205, passes through an objective lens 206 to be focused onto an optomagnetic disc 207 as an optical information recording medium, where information may be recorded. And, the light reflected from the optomagnetic disc 207 is reflected by the first beam splitter 204 and then divided into two light beams by a second beam splitter 208, where one of the divided light beams transmits therethrough to be directed toward a servo optical system 209 and the other of the divided light beams is reflected to be directed toward an optomagnetic detection system 210.

In the servo optical system 209, the light beam passes through a pair of lenses 211 and to be focused onto a light-receiving device 212, whereby a focusing error signal and a tracking error signal are detected to thereby carry out focusing and tracking servo control operations. In the optomagnetic optical system 210, the light beam passes through a half wavelength plate 213 and a focusing lens 214 and is divided into two beams by a polarization beam splitter 215, which are then focused onto respective light-receiving devices 216 and 217 to thereby produce an optomagnetic signal from which the information recorded on the optical disc 207 is reproduced.

Figure 26:
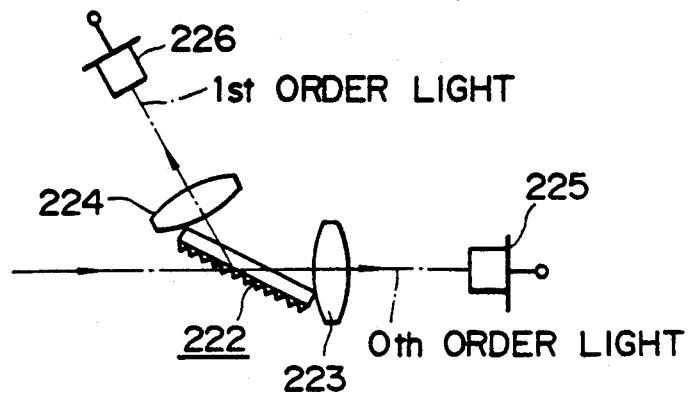
Figure 27:
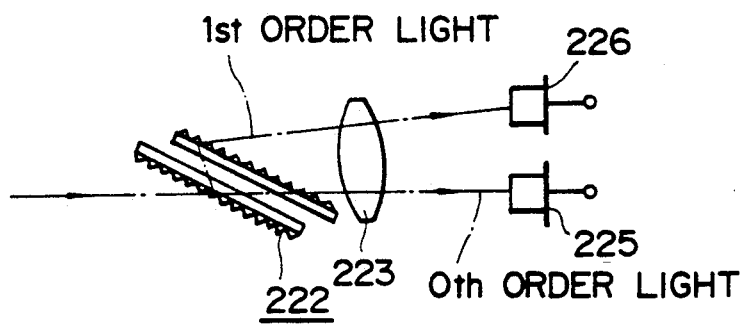
Figure 28:
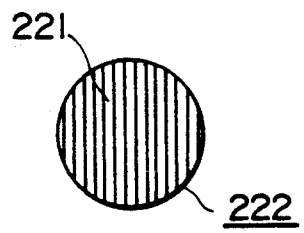
FIG. 28 is a schematic illustration showing the structure of a hologram used in the structure shown in FIG. 10 or 11.
Figure 29:
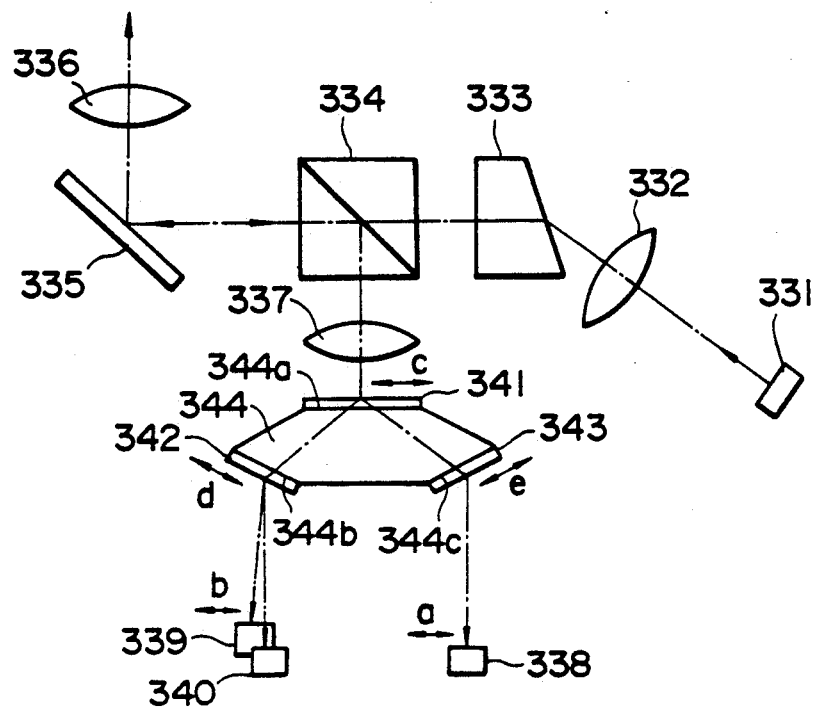
FIG. 29 is a schematic illustration showing the overall structure of an optomagnetic optical pick-up constructed in accordance with one embodiment of the present invention.

In such an apparatus, various proposals have been made to endeavor to reduce the number of parts. For example, FIGS. 25 through 27 illustrate several such examples which are so structured to reduce the number of parts particularly in the optomagnetic optical system 210. In FIG. 25, instead of the above-described polarization beam splitter 215, provision is made of a Wollaston prism 218 which divides a light beam into two light beams which are then focused by a lens 219 onto a 2-division light-receiving device 220 to thereby detect an optomagnetic signal. However, it cannot be said that the number of parts is reduced in such a structure. In FIG. 26, instead of the polarization beam splitter 215, provision is made of a hologram 222 (see FIG. 28) provided with straight grooves 221, which separates incoming light into transmitting light (0th order light) and diffracted light (1st order light) which are focused by lenses 223 and 224, respectively, onto respective light-receiving devices 225 and 226 to carry out detection. However, also in this case, the diffraction angle of the hologram 222 is large and there must be provided two lenses 223 and 224 and two light-receiving devices 225 and 226 so that the number of parts is not reduced. Furthermore, in FIG. 27, two of the hologram of FIG. 26 are provided to make two light paths, i.e., one for the 0th order light and the other for the 1st order light, extending in the same direction to reduce the installation space. However, also in this case, the number of parts cannot be said to be reduced. It is to be noted that reference should be made to FIG. 11 regarding a relationship between the direction of polarization and the light intensity for the 0th and 1st order light.

In this manner, the prior proposals cannot be said to have successfully reduced the number of parts in the optomagnetic optical system 210. Moreover, in the prior art approaches, since a reduction of the number of parts has not been effected extensively for the entire system including both of the optomagnetic optical system 210 and the servo control system 209, there has been a problem of incapability to make the entire apparatus compact in size and light in weight.

This aspect of the present invention has been particularly directed to obviate such disadvantages as set forth immediately above and has its object to provide an improved optomagnetic optical pick-up compact in size, light in weight and low at cost with a reduction of number of parts. In accordance with this aspect of the present invention, there is provided an optomagnetic optical pick-up which comprises a hologram differing in groove spacing in an optical path for the light reflected from an optical information recording medium, such as an optical disc (optomagnetic disc). A 2-division light-receiving device is provided in an optical path for the light which has transmitted through and focused by the hologram. In addition, a 4-division light-receiving device is provided in an optical path for the diffracted light which has been diffracted and focused by the hologram. Thus, the light which has transmitted through the hologram is received by the 2-division light-receiving device to carry out a tracking servo control operation, and the light diffracted by the hologram is received by the 4-division light-receiving device to carry out a focusing servo control operation. Besides, by comparing all of the amounts of light received by the 2-division and 4-division light-receiving devices, an optomagnetic signal can be detected. As a result, in accordance with the present aspect of the present invention, the number of parts can be reduced significantly so that there can be provided an optomagnetic optical pick-up compact in size, light in weight and low at cost.

Now, referring to FIGS. 17 through 20, an optomagnetic optical pick-up for use in an optomagnetic information recording and reproducing apparatus constructed in accordance with one embodiment of this aspect of the present invention will be described in detail below. Since the basic structure of the present invention is similar in many respects to that of the typical prior art shown in FIG. 24 and described above, only those portions which relate directly to this aspect of the present invention will be shown and explained below while omitting an explanation regarding the common basic structure. In addition, like numerals will be used to indicate like elements.

As shown, a hologram 227 is formed with straight grooves 228 with differing groove spacing T at one surface thereof and it is disposed in an optical path $L_0$ for the light which has been reflected from an optomagnetic disc 207. A 2-division light-receiving device 229 is disposed in the optical path $L_0$ for the transmitted light (0th order light) which has transmitted through the hologram 227 and for receiving the light through a focusing lens 230. A 4-division light-receiving device 231 is disposed in an optical path $L_1$ for the diffracted light (1st order light) which has been diffracted by the hologram 227 and for receiving the diffracted light through a focusing lens 232.

With this structure, the reflected light which has been reflected by the optomagnetic disc 207 passes through the hologram 227, whereby the light is separated into two light beams of the 0th order light and the 1st order light. In the first place, the 0th order light is focused by the focusing lens 230 onto the 2-division light-receiving device 229 to thereby detect a tracking error signal which is used for carrying out a tracking servo control operation. On the other hand, the 1st order light is focused onto the 4-division light-receiving device 231 by the focusing lens 232 to thereby produce astigmatism, whereby a focusing error signal is detected to carry out a focusing servo control operation. With the 0th and 1st order light set to have the light intensity ratio of 1:1 and by comparing all of the amounts of light received by the 2-division and 4-division light-receiving devices 229 and 231, an optomagnetic signal of the optomagnetic disc 207 can be detected to reproduce the information stored on the disc 207.

As described above, since the reflected light from the optomagnetic disc 207 is divided into two light beams by the hologram 227 and the thus divided light beams are directed toward the 2-division and 4-division light-receiving devices 229 and 231, respectively, a servo detecting operation, such as a tracking servo detecting operation and a focusing servo detecting operation, can be carried out and also an optomagnetic detecting operation can also be carried out. Thus, the number of parts in these detecting optical systems can be reduced significantly, which contributes to make an apparatus compact in size and light in weight.

Figure 21:
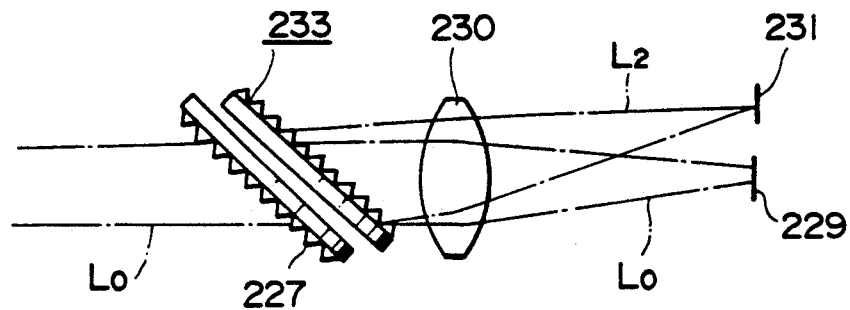
FIG. 21 is a schematic illustration showing another optomagnetic optical pick-up for use in an optomagnetic information recording and reproducing apparatus constructed in accordance with another embodiment of the present invention.
Figure 22:
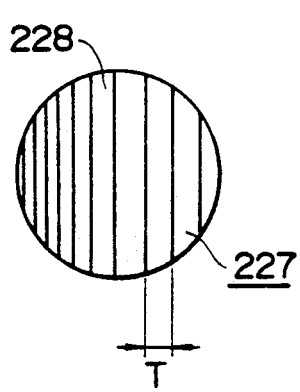
FIGS. 22 and 23 are illustrations showing the structures of the respective holograms used in the structure of FIG. 21.
Figure 23:
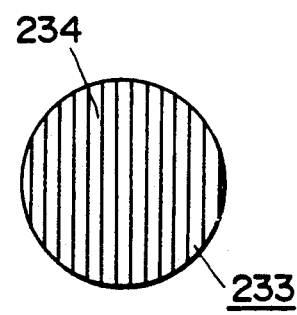

Next, another embodiment of this aspect of the present invention will be described with reference to FIGS. 21 through 23. This embodiment is a modification of the previously described embodiment and thus like elements are indicated by like numerals. As shown, a hologram 233 is formed with a plurality of straight grooves 234 spaced apart at an equal interval at one surface thereof and the other surface of the hologram 233 is in contact with the flat surface of the holgram 227. And, the composite holgram including the holograms 227 and 233 is disposed in the optical path $L_0$ as inclined. The 2-division and 4-division light-receiving devices 229 and 223 are so disposed to receive the light beams from the composite hologram through a common focusing lens 230. Thus, the devices 229 and 230 are located on the same side of the focusing lens 230 in optical paths $L_0$ and $L_1$, respectively, which extend generally in the same direction.

With this structure, when the light reflected from the optomagnetic disc 207 passes through the combined holograms 227 and 233, it is separated into two light beams, i.e., the 0th order light and the 1st order light. Then, both of the separated light beams are focused by the focusing lens 230 onto the respective light-receiving devices 231 and 229. In this case, the 0th order light beam is focused onto the 2-division light-receiving device 229 to be detected as a tracking error signal; on the other hand, the 1st order light beam is focused onto the 4-division light-receiving device 231 as light having astigmatism to be detected as a focusing error signal. In this manner, by utilizing the light beams led to the respective 2-division and 4-division light-receiving devices 229 and 231, both of a servo detecting operation and an optomagnetic signal detection operation can be carried out similarly with the above-described embodiment of this aspect of the present invention. Furthermore, since the detecting optical systems are closer together in the present embodiment, the overall structure of the apparatus can be made smaller as compared with the previously described embodiment.

Figure 33:
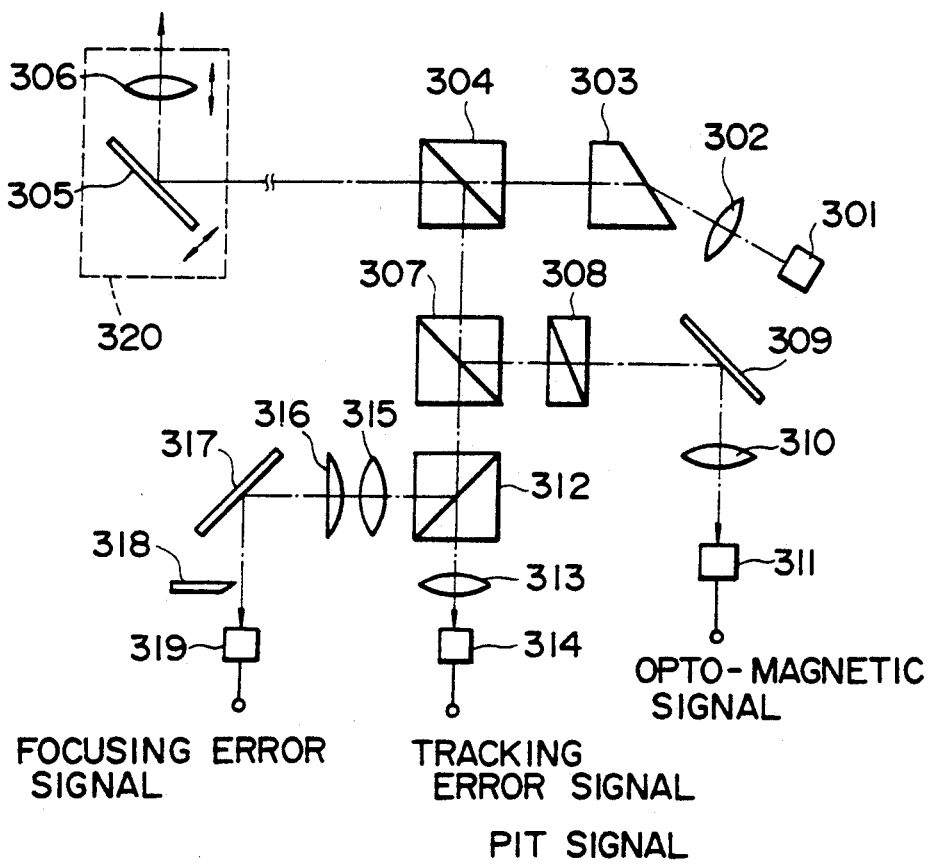
FIG. 33 is a schematic illustration showing the overall structure of a typical prior art optomagnetic optical pick-up for use in an optomagnetic information recording and reproducing apparatus.

Now, a still further aspect of the present invention will be described. This aspect of the present invention relates to improvements in an optomagnetic optical pick-up for use in an optomagnetic information recording and reproducing apparatus. FIG. 33 schematically illustrates a typical prior art optomagnetic optical pick-up. As shown, the laser light emitted from a semiconductor laser 301 passes through a collimator lens 302 to be collimated and then passes through a beam shaping prism 303 to be shaped to have a circular cross section. Thereafter, the thus shaped light beam passes through a beam splitter 304, a movable mirror 305 and an objective lens 306 to be focused onto an optomagnetic disc (not shown).

The reflected light from the optomagnetic disc again passes through the objective lens 306 and the movable mirror 305, and thereafter it is separated from the incoming light by the beam splitter to advance toward a detecting system. A part of the light separated by the beam splitter 307 passes through an analyzer 308, a mirror 309 and a lens 310 to be focused onto a light-receiving device 311 (e.g., an avalanche photodiode) to be used for detecting an optomagnetic signal. On the other hand, the remaining portion of the light separated by the beam splitter 307 is further divided into two light beams by a beam splitter 312, one of which passes through a lens 313 to be focused onto a light-receiving device 314 (e.g., pole type 2-division photodiode) to be used for detecting a tracking error signal and a pit signal and the other of which passes through a lens 315, a cylindrical lens 316, a mirror 317 and a knife edge 318 to be focused onto a light-receiving device 319 (e.g., 2- division photodiode) to be used for detecting a focusing error signal based on a knife edge method.

In such an optomagnetic optical pick-up, since the number of parts of optical elements is extremely large as compared with a common optical pick-up for use in an optical pick-up, only the movable mirror 305 and the objective lens 306 are provided as an access movable portion 320 to provide a high-speed access operation to thereby separate the remaining portion from this movable portion 320. However, although an extremely rigorous driving accuracy is required for the access movable portion 320, the actual accuracy is not sufficient so that there occurs faulty reading and malfunctioning.

Figure 34:
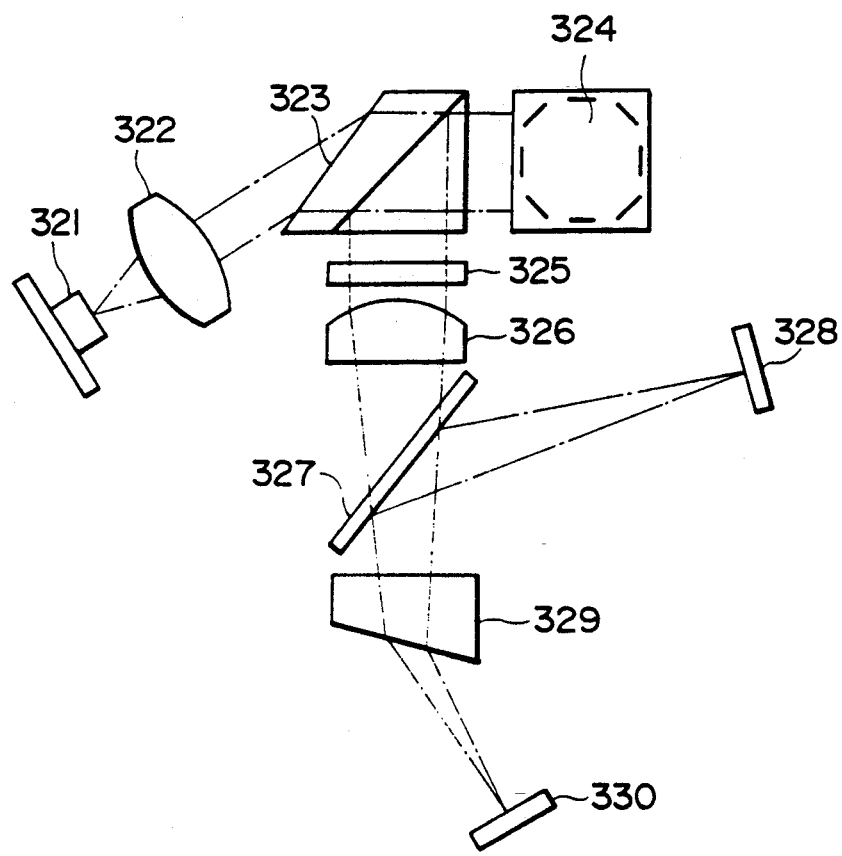
FIG. 34 is a schematic illustration showing the overall structure of another typical prior art optomagnetic optical pick-up.

On the other hand, in order to simplify the optical system, there has been proposed an optomagnetic optical pickup utilizing a polirizing hologram optical element as shown in FIG. 34. In this structure, laser light emitted from a semiconductor laser 321 passes through a collimator lens 322, a beam shaping prism 323 and a mirror/focusing lens 324 to be focused onto an optomagnetic disc. The light reflected from the optomagnetic disc agains passes through the mirror/focusing lens 324 and the beam shaping prism 323, and, then, through a half wavelength plate 325 and a lens 326 to be incident upon a polarizing hologram optical element 327 at a Bragg angle so that the light is separated into a diffracted light beam and a transmitted light beam. The diffracted light beam is spatially divided into four light beams by the polarizing hologram optical element 327 and received by a light-receiving device 328 to be used in the detection of tracking and focusing errors. On the other hand, the transmitted light passes through a birefringent wedge 329 to be received by a light-receiving device 230 for use in detection of the information recorded on the optical disc. The polarizing hologram optical element 327 is an element for diffracting only the TE polarized light (i.e., polarized light in parallel with the grating grooves). Since a signal light component due to the Kerr rotation is the TM polarized light perpendicular thereto, an excellent signal can be reproduced without a loss in the information detecting system.

Using such polarizing hologram optical element 327, the assembling and adjusting times may be shortened; however, since the light beam separating angle by the polarizing hologram optical element 327 is large, it is difficult to make the entire structure smaller to the extent to have this polarizing holgram optical element 327 mounted on the access movable portion.

This aspect of the present invention has been addressed to obviate the particular disadvantages set forth above and has an object to provide an improved optomagnetic optical pick-up light in weight, compact in size, easy to manufacture and adjust and fast in operation. Therefore, in accordance with this aspect of the present invention, there is provided an optomagnetic optical pick up for use in an optomagnetic information recording and reproducing apparatus which comprises a plurality of hologram diffraction grating substrates having different functions and a transparent support having a plurality of mounting surfaces to which the plurality of hologram diffraction grating substrates are attached to be positioned in a predetermined relative arrangement.

Referring now to FIGS. 29 through 33, an optomagnetic optical pick-up constructed in accordance with one embodiment of this aspect of the present invention will be described in detail below. In a manner similar to that described with reference to FIG. 33, laser light emitted from a semiconductor laser 331 is collimated by a collimator lens 332 and then shaped to have a circular cross section by a beam shaping prism 333. Then, the light beam thus shaped passes through a beam splitter 334 and a movable mirror 335 and then it is focused onto an optomagnetic disc (not shown) by an objective lens 336. The light reflected from the optomagnetic disc again passes through the objective lens 336 and the movable mirror 335, and, thereafter, the reflected light beam is separated from the incoming light beam by the beam splitter 334 to be directed toward a detecting system through a focusing lens 337.

Figure 30A:
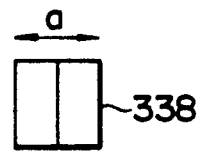
FIGS. 30a through 30c are schematic illustrations showing the structures of the respective light-receiving devices used in the structure shown in FIG. 29.
Figure 30B:
Figure 30C:
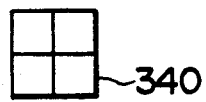

In this detecting system, there are provided light-receiving elements such as an optomagnetic signal detecting light-receiving device 338 having a 2-division photodiode structure as shown in FIG. 30a, a tracking error detecting light-receiving device 339 having a 2-division photodiode structure as shown in FIG. 30b and a focusing error detecting light-receiving device 340 having a 4-division photodiode structure as shown in FIG. 30c. It is to be noted that directions indicated by arrows a and b shown in FIG. 29 correspond to directions indicated by arrows a and b in FIGS. 30a and 30b, respectively, and they indicate the direction of division in each of the light-receiving devices 338 and 339 in FIG. 29.

In the present embodiment, in order to guide the light passing through the focusing lens 337 to these light-receiving devices 338, 339 and 340, there are provided three hologram diffraction grating substrates 341, 342 and 343 having differing functions. There is also provided a generally hexagonally shaped transparent support 344 formed with three mounting surfaces 344a, 344b and 344c for mounting thereon these three hologram diffraction grating substrates 341, 342 and 343 so as to arrange them in a predetermined relative positional arrangement. The transparent support 344 is comprised of a material which has an appropriate refractive index and which allows a light flux to transmit therethrough, and its outer shape is determined by a relative positional relationship of the plurality of hologram diffraction grating substrates 341, 342 and 343 to be provided. That is, if the shape and the index of refraction of the transparent support 344 are accurate, there can be obtained a detecting optical element capable of carrying out a light flux separating function without adjustments simply by attaching three hologram diffraction grating substrates 341, 342 and 343 to the respective mounting surfaces 344a, 344b and 344c.

A hologram diffraction grating substrate 341 serves to separate a light flux incident from above through the focusing lens 337 into ±1st order diffraction light fluxes in the left and right directions as indicated by the arrows c, and thus it is comprised of a relatively coarse (i.e., its pitch is larger than the wavelength of the laser light) straight gratings. With the hologram diffraction grating substrate 341 present at the mounting surface 344a of the transparent support 314, the light from the focusing lens 337 is divided into two light beams in the left and right directions and the thus divided two light beams travel within the transparent support 344 toward the mounting surfaces 344b and 344c.

Figure 31A:
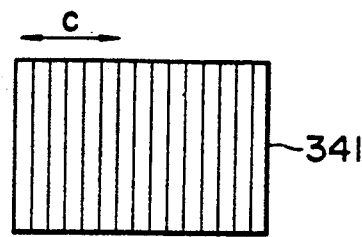
FIGS. 31a through 31c are schematic illustrations showing the structures of the respective hologram diffraction gratings used in the structure shown in FIG. 29.
Figure 31B:
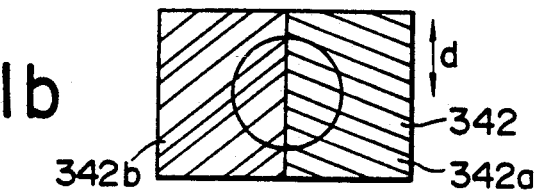

The hologram diffraction grating 342 attached to the mounting surface 344b serves to further divide the incoming light beam which has been divided by the hologram diffraction grating substrate 341 into two light beams in a direction vertical to the plane of the drawing, i.e., toward a pair of light-receiving devices 339 and 340 spaced apart from each other in the direction perpendicular to the plane of the drawing. And, the hologram diffraction grating 342 is comprised, for example, of a plurality of inclined straight gratings 342a and 342b as shown in FIG. 31b. More specifically, the region 342a which corresponds to the tracking error detecting light-receiving device 339 is comprised of a plurality of straight gratings which are spaced apart at a predetermined pitch; on the other hand, the region 342b which corresponds to the focusing error detecting light-receiving device 340 using an astigmatic method is comprised of a plurality of gratings which are spaced apart from each other randomly to thereby allow to produce an appropriate astigmatic deviation.

Figure 31C:
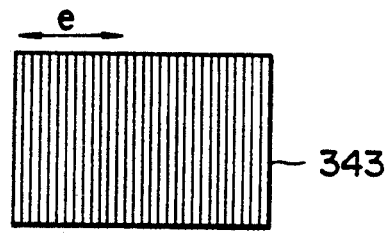

The hologram diffraction grating substrate 343 attached to the mounting surface 344c serves to separate by polarization the remaining light which has been separated by the hologram diffraction grating substrate 341 and guide it toward the 2-division region of a light-receiving device 338, and, in particular, it is structured to have a relatively dense (i.e., its pitch is smaller than the wavelength of the laser) linear diffraction gratings on the front and rear surfaces as shown in FIG. 31c so that it has a polarization separation function as in a polarizing beam splitter. In accordance with this embodiment, an optomagnetic optical pick-up simple in structure, compact in size, light in weight and easy in adjustment can be obtained simply by attaching three hologram diffraction grating substrates 341, 342 and 343 to the transparent substrate 344.

Figure 32:
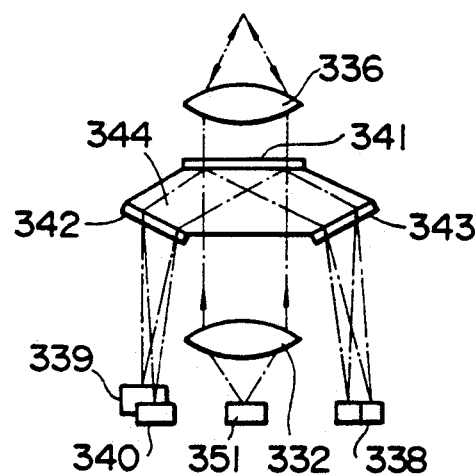
FIG. 32 is a schematic illustration showing the overall structure of an optomagnetic optical pick-up constructed in accordance with another embodiment of the present invention.

FIG. 32 illustrates an optomagnetic optical pick-up constructed in accordance with another embodiment of this aspect of the present invention. As shown, this embodiment uses a semiconductor laser 351 which does not require beam shaping instead of the semiconductor laser 331 in the previous embodiment, and, thus, the present embodiment can be simpler in structure. The semiconductor laser 351 is disposed at the center among the light-receiving devices 338, 339 and 340. The light emitted from the semiconductor laser 351 is collimated by a collimator lens 332 and the thus collimated laser beam passes through the transparent support 344 and the hologram diffraction grating substrate 341. Then, the light is focused onto an optomagnetic disc by an objective lens 336 straight. In the present embodiment, a beam shaping system can be omitted and the optical system as a whole can be made compact in size and light in weight. Thus, even if an optical system as a whole without separating the access movable portion were driven to move, a sufficient high-speed access operation could be obtained. Besides, in the present embodiment, since the light-receiving section (i.e., light-receiving devices 338, 339 and 340) and the light-emitting section (i.e., semiconductor laser 351) are located on the same plane, all of these elements can be disposed on the same substrate with high positional accuracy and thus requirements for adjustments in position can be reduced significantly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. In an optical recording and reproducing apparatus for recording information on an optical information recording medium by applying light emitted from a semiconductor laser and reproducing information recorded on said medium by detecting an optomagnetic signal from said medium while carrying out focusing and tracking servo control operations using light reflected from said medium, an optomagnetic pick-up comprising:
   a hologram disposed in an optical path for light reflected from said medium and having a plurality of grooves arranged varying in spacing;
   a 2-division light-receiving device disposed in an optical path for receiving a first light beam which has been transmitted through and focused by said hologram; and
   a 4-division light-receiving element disposed in an optical path for receiving a second light beam which has been diffracted and focused by said hologram.

2. The pickup recited in claim 1, wherein said hologram separates the light reflected from said medium utilizing the direction of polarization of said reflected light.

3. The pickup recited in claim 1, further including a second hologram disposed in the optical paths of said first and second light beams.

4. The pickup recited in claim 3, including a single focusing lens disposed in the optical paths of said first and second light beams to focus said first and second light beams on said 2-division device and 4-division light receiving element, respectively.

5. The pickup recited in claim 3, in which said second hologram comprises grooves which are spaced apart at equal intervals.

6. The pickup recited in claim 1, in which said grooves are spaced apart at gradually increasing distances.

7. The pickup recited in claim 1, in which each of said first light beam and said second light beam is non-divergent.

8. A pick-up for use in an optomagnetic information recording and reproducing apparatus for recording information on an optomagnetic information recording medium by applying light emitted from a semiconductor laser to said medium and reproducing information recorded on said medium by detecting an optomagnetic signal from said medium while carrying out focusing and tracking servo control operations using light reflected from said medium, said pick-up comprising:
   a hologram disposed in an optical path for light reflected from said medium and having a plurality of grooves spaced apart at varying distances from each other, said hologram utilizing the direction of polarization of said reflected light for transmitting and focusing said reflected light to thereby generate a first light beam and for diffracting and focusing said reflected light to thereby generate a second light beam;
   a 2-division light-receiving device disposed in an optical path for receiving said first light beam; and
   a 4-division light-receiving device disposed in an optical path for receiving said second light beam.

9. A pickup as recited in claim 8, further comprising means for detecting the difference between the transmitted light of said first light beam detected by said 2-division light-receiving device and diffracted light of said second light beam detected by said 4-division light receiving device.

10. A pickup as recited in claim 8, including a second hologram disposed in the optical paths of said first and second light beams.

11. A pickup as recited in claim 10, including a single focusing lens disposed in the optical paths of said first and second light beams to focus said first and second light beams on said 2-division and 4-division device, respectively.

12. A pickup as recited in claim 10, in which said second hologram comprises grooves which are spaced apart at equal intervals.

13. A pickup as recited in claim 8, in which said grooves are spaced apart at gradually increasing distances.

14. A pickup as recited in claim 8, in which each of said first light beam and said second light beam is non-divergent.

15. A method for recording on and reproducing information from an optomagnetic information recording medium by applying light emitted from a semiconductor laser and reproducing information recorded on said medium by using a pickup to detect an optomagnetic signal from said medium while carrying out focusing and tracking servo control operations using light reflected from said medium, comprising:

disposing, in an optical path for light reflected from said medium, a hologram having a plurality of grooves spaced apart at varying distances and utilizing the direction of polarization of said reflected light, to thereby generate a first light beam which has been transmitted and focused by the hologram and a second light beam which has been diffracted and focused by the hologram;

receiving said first light beam at a 2-division light-receiving device for generating therefrom a tracking error signal; and receiving said second light beam at a 4-division light-receiving device for generating therefrom a focusing error signal.

16. The method recited in claim 15, wherein the difference between said first light beam detected by said 2-division light-receiving device and said second light beam detected by said 4-division light beam is representative of said optomagnetic signal.

17. The method recited in claim 15, further including disposing a second hologram in the optical paths of said first and second light beams.

18. The method recited in claim 15, including focusing said first and second light beams on said 2-division device and 4-division device, respectively, by a single focusing lens disposed between the second hologram and said devices.

* * * * *